United States Patent
Salvato et al.

(10) Patent No.: US 10,660,299 B2
(45) Date of Patent: May 26, 2020

(54) WASTE CONTAINER FOR A LITTER BOX

(71) Applicant: TabbyRoo, Inc., Freeport, NY (US)

(72) Inventors: Deborah Salvato, East Meadow, NY (US); Fabiola Simone, East Meadow, NY (US); Thomas Nagler, Ronkonkoma, NY (US); Michael Botta, Ronkonkoma, NY (US); Steven Goldberg, Freeport, NY (US)

(73) Assignee: TabbyRoo, Inc., Freeport, NY (US)

( * ) Notice: Subject to any disclaimer, the term of this patent is extended or adjusted under 35 U.S.C. 154(b) by 374 days.

(21) Appl. No.: 15/810,467

(22) Filed: Nov. 13, 2017

(65) Prior Publication Data

US 2018/0228122 A1    Aug. 16, 2018

Related U.S. Application Data

(60) Provisional application No. 62/459,163, filed on Feb. 15, 2017.

(51) Int. Cl.
*A01K 1/01* (2006.01)

(52) U.S. Cl.
CPC .................. *A01K 1/0107* (2013.01)

(58) Field of Classification Search
CPC ........................ A01K 1/0107; A01K 1/0125
USPC ................................................ 119/166, 170
See application file for complete search history.

(56) References Cited

U.S. PATENT DOCUMENTS

| | | | |
|---|---|---|---|
| 5,083,671 A * | 1/1992 | Hayes | B65D 50/061 215/224 |
| 5,855,186 A * | 1/1999 | Larsen | A01K 1/0114 119/166 |
| 7,487,743 B1 * | 2/2009 | Lane | A01K 1/0114 119/161 |
| D615,751 S * | 5/2010 | Avery | D3/215 |
| 2002/0134314 A1 * | 9/2002 | Carlisi | A01K 1/0107 119/166 |
| 2009/0288610 A1 * | 11/2009 | Casiana | A01K 1/011 119/166 |
| 2011/0088630 A1 * | 4/2011 | Krotts | A01K 1/0114 119/166 |
| 2011/0214614 A1 * | 9/2011 | Sharp | A01K 29/00 119/166 |
| 2015/0114303 A1 * | 4/2015 | Shamir | A01K 1/0114 119/166 |
| 2015/0173323 A1 * | 6/2015 | Plazarte | A01K 1/0114 119/163 |
| 2017/0231190 A1 * | 8/2017 | Brawn | A01K 1/011 119/166 |

* cited by examiner

*Primary Examiner* — Claude J Brown
(74) *Attorney, Agent, or Firm* — Collard & Roe, P.C.

(57) ABSTRACT

A waste storage container for a litter box for pets, that consists of a housing having a bottom surface and four side walls, creating an interior cavity therein, and a lip surrounding a top edge of the four side walls, the lip extending outward from the sidewalls and away from the cavity. There is a hook connected to one of the sidewalls, and being configured for attachment to a top edge of a litter box. A foot plate extends outward from the sidewall beneath the hook to keep the waste container in an upright position when the waste container is connected to a litter box with sloped walls. There is also a lid configured for attachment to the housing to cover the cavity.

9 Claims, 4 Drawing Sheets

WASTE CONTAINER FOR A LITTER BOX

CROSS-REFERENCE TO RELATED APPLICATIONS

This application claims priority under 35 USC 119(e) of U.S. Provisional Application Ser. No. 62/459,163 filed on Feb. 15, 2017, the disclosure of which is herein incorporated by reference.

BACKGROUND OF THE INVENTION

1. Field of the Invention

This invention relates to a waste container for a litter box for pets. In particular, the invention relates to a storage container that makes cleaning the litter box simple and efficient, because the used litter can be scooped directly from the litter box into the storage container with no mess or dust.

2. The Prior Art

Cleaning a litter box is often a messy, dusty process. The used litter must be scooped out of the box and placed in a waste container or bag using manual tools. Moving the litter around can lead to dust particles in the air and a mess in the surrounding area. There have been attempts to create self cleaning litter boxes to eliminate the need for this process, but these are cumbersome and expensive.

SUMMARY OF THE INVENTION

It is therefore an object of the invention to provide a way to clean a standard litter box that eliminates the mess and dust associated with conventional cleaning processes. It is another object of the invention to provide a storage container for the waste from a litter box that is inexpensive to produce, simple to attach to the litter box, and easy to clean.

These and other objects of the invention are accomplished by a waste container for a litter box for pets, that consists of a housing having a bottom surface and four side walls, creating an interior cavity therein, and a lip surrounding a top edge of the four side walls, the lip extending outward from the sidewalls and away from the cavity. There is a hook connected to one of the sidewalls, and being configured for attachment to a top edge of a litter box. A foot plate extends outward from the sidewall beneath the hook to keep the waste container in an upright position when the waste container is connected to a litter box with sloped walls. There is a also a lid configured for attachment to the housing to cover the cavity.

Preferably, the lip forms carrying handles on two opposite side walls of the housing to facilitate transport of the waste container back and forth to the litter box and/or to other litter boxes. One waste container can be used for several litter boxes, as it is attached and removed quickly and easily.

On the side wall that has the hook, the lip forms a covering surface, such that when the hook is connected to a top rim of a litter box, the covering surface extends over the top rim of the litter box and into the litter box. The sweeping surface is an extended area of the lip. This allows litter to be scooped from the litter box into the waste container without risk of any spillage.

The lid can be removable or hinged to the housing. In one embodiment, the lid is hinged to the housing, and in a closed position, the lid is flush with or recessed below a height of the lip, and in an open position, the lid is fixed in a vertical position. In order to accomplish this, one edge of the lid has an attachment projection extending outward therefrom, and a receptacle is provided on the lip of the housing. The receptacle has a recess corresponding to a shape of the projection, such that placing the projection in the recess fixes the lid in the vertical position. To keep the lid attached to the container, the projection has locking lugs on either side that snap into the recess and are held there in a snap fit manner. To close the lid, the lid is lifted upward until the lugs abut the top of the recess, and then rotated around until the lid rests flush on top of the container.

The hook and foot plate can be integrally formed with the housing, or the hook and foot plate can be separate components that are attached to the housing. In one embodiment, the hook and foot plate are formed as one piece with each other and are attached to the housing. The hook and foot plate can be made of metal, plastic or any other suitable material. The housing is preferably made of plastic, but other materials such as ceramic or metal could also be used.

In order to keep the lid securely in place on the housing, an underside of the lid has a flange extending around the periphery and inset from an edge of the lid. This flange abuts the side walls and extends into the cavity when the lid is in a closed position. This prevents the lid from sliding around the top of the housing and creates an airtight seal to limit the escape of dust and odors from the container.

In order to assist in opening the lid, the lid has a tab on an edge opposite the projection, the tab extending upward and away from the lid to facilitate lifting the lid off of the housing. To use, the user simply has to place a finger under the tab and lift upwards to lift the lid off of the housing.

In use, the waste container with the hook and foot plate attached are connected to the litter box by placing the hook over the top edge of the litter box. The container is braced against the wall of the litter box by the foot plate, so that the container is maintained in an upright position. The lip of the housing extends over the edge of the container, and forms a covering surface, so that used litter can be simply scooped from the litter box, over the covering surface and directly into the container with no risk of spilling the litter outside of the litter box or waste container. The lid can then be lifted up from the recess and closed over the container to prevent any dust or smell from the litter escaping. The waste container according to the invention makes cleaning litter boxes simple, because the container can be moved between several different litter boxes, and the direct scooping of the litter into the box, as well as the secure lid prevents dust and odor from contaminating the area.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
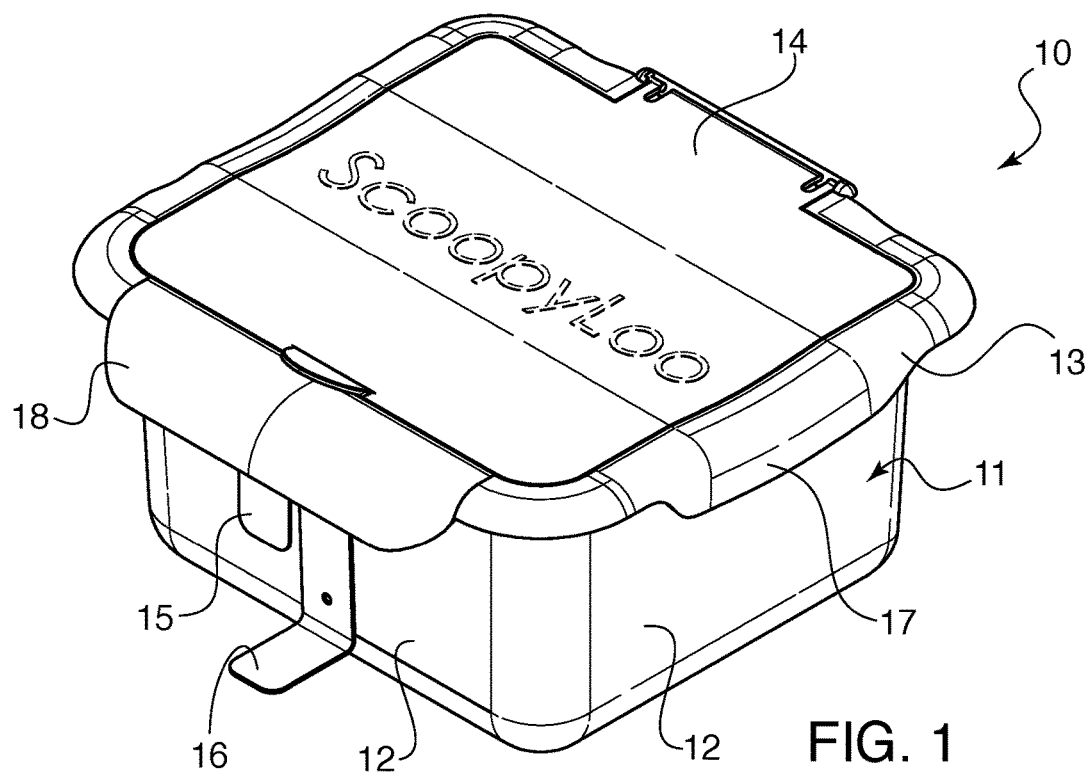
FIG. 1 shows a perspective view of the waste container according to the invention.
Figure 2:
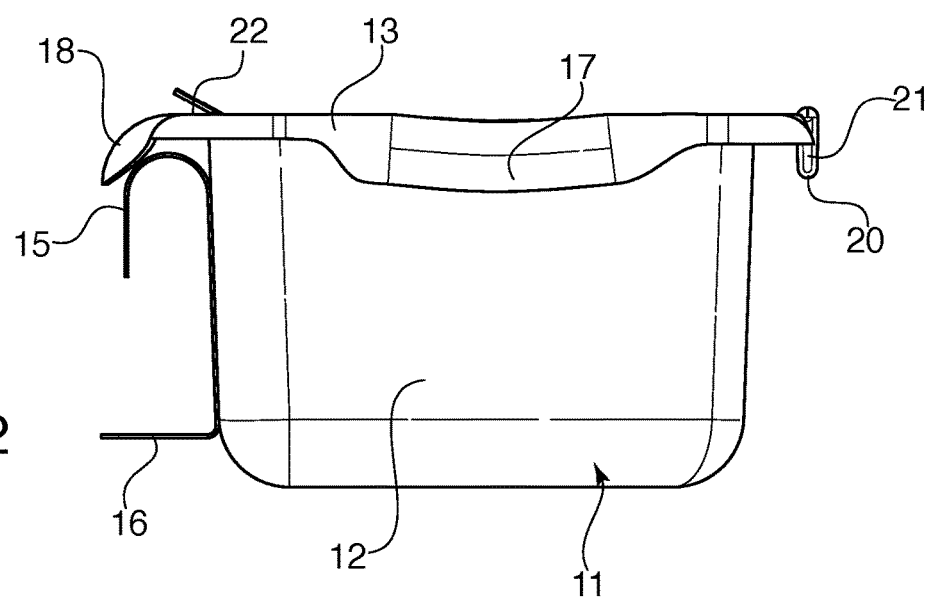
FIG. 2 shows a side view of the container.
Figure 3:
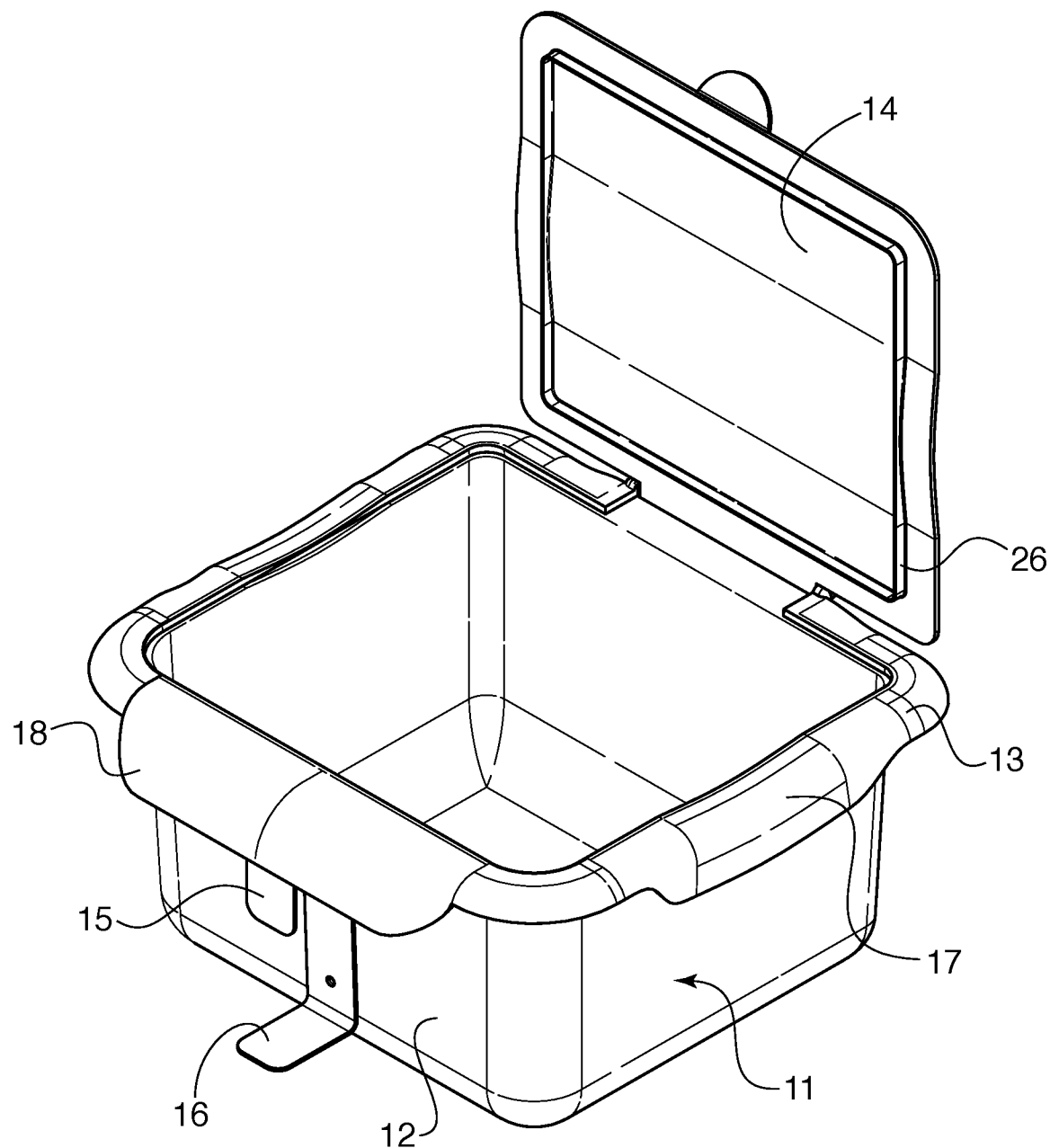
FIG. 3 shows the container with the lid in an open position.
Figure 4:
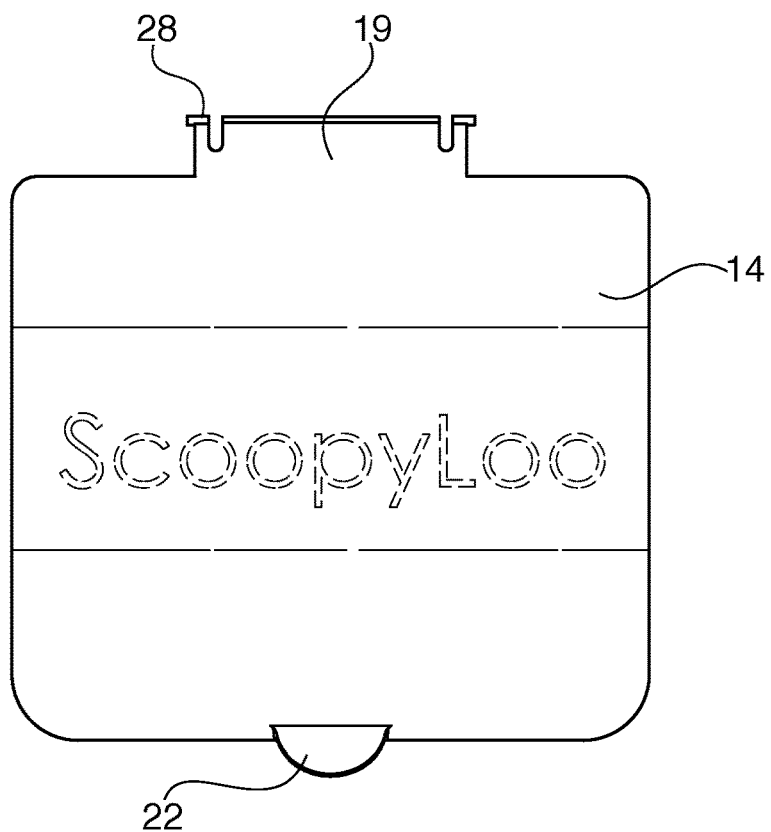
FIG. 4 shows the lid of the container.
Figure 5:
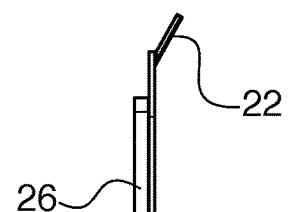
FIG. 5 shows a side view of the container with the lid in an open position.
Figure 5:
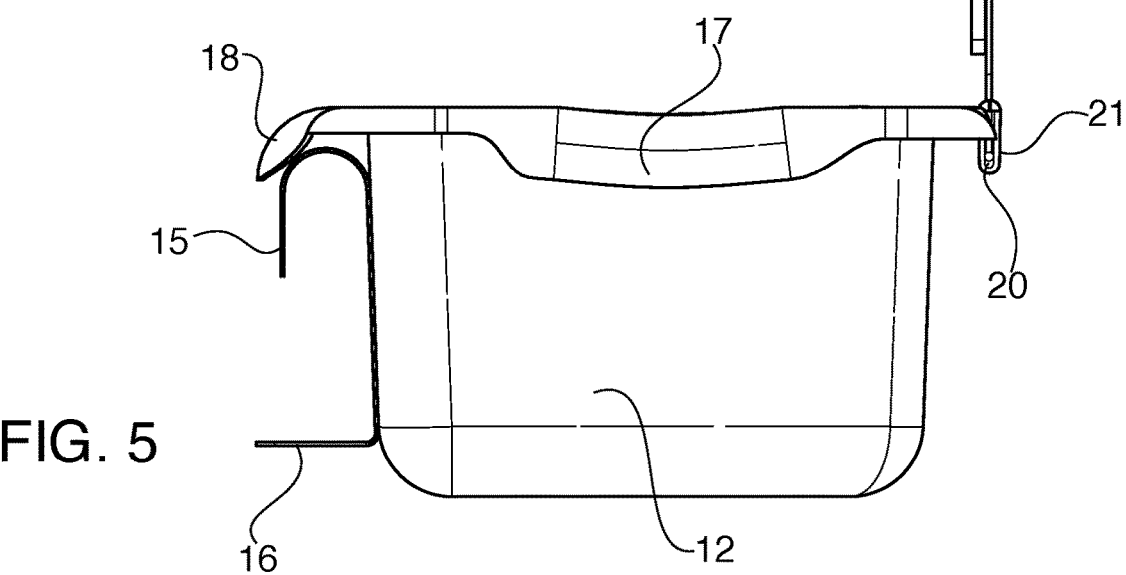

Referring now in detail to the drawings, FIGS. 1-5 show the waste container 10 according to the invention. Container 10 consists of a housing 11 having side walls 12, a lip 13 surrounding the side walls, and a lid 14. A hook 15 and foot plate 16 are formed in one piece and connected to one of the side walls 12.

On two opposite sides of housing 11, lip 13 is formed into carrying handles 17, to assist in transporting container 10. Lip 13 also forms a sweeping surface 18, that projects over hook 15.

Lid 14 is configured of a flat surface having a projection 19 extending from one edge. Projection 19 is configured to fit within a recess 21 of a receptacle 20 when lid 14 is in an open position. Projection 19 can be equipped with locking lugs 28 that are snapped into recess 21 and maintained there due to a top edge of the recess being narrower than locking lugs 21, to keep lid 14 connected to housing 11 regardless of whether the lid is open or closed. To close lid 14, projection 19 is lifted up from recess 21 until locking lugs abut the top of recess 21 where they are stopped, and the lid is then rotated until lid 14 is placed on top of housing 11.

Lid 14 can also be equipped with a tab 22 to facilitate opening lid 14. The user only has to place their finger under tab 22 and lift up. Lid 14 can be directly put into the open position this way, with projection 19 sliding directly into recess 21 upon lifting of lid 14.

A flange 26 runs around the perimeter of the inside of lid 14, inset from the edge. In the closed position, flange 26 abuts the inside surface of side walls 12, and helps to ensure that lid 14 remains fixed in position on housing 11. Flange 26 also helps to create an air-tight seal between lid 14 and housing 11, so that dust and odors do not escape.

Figure 6:
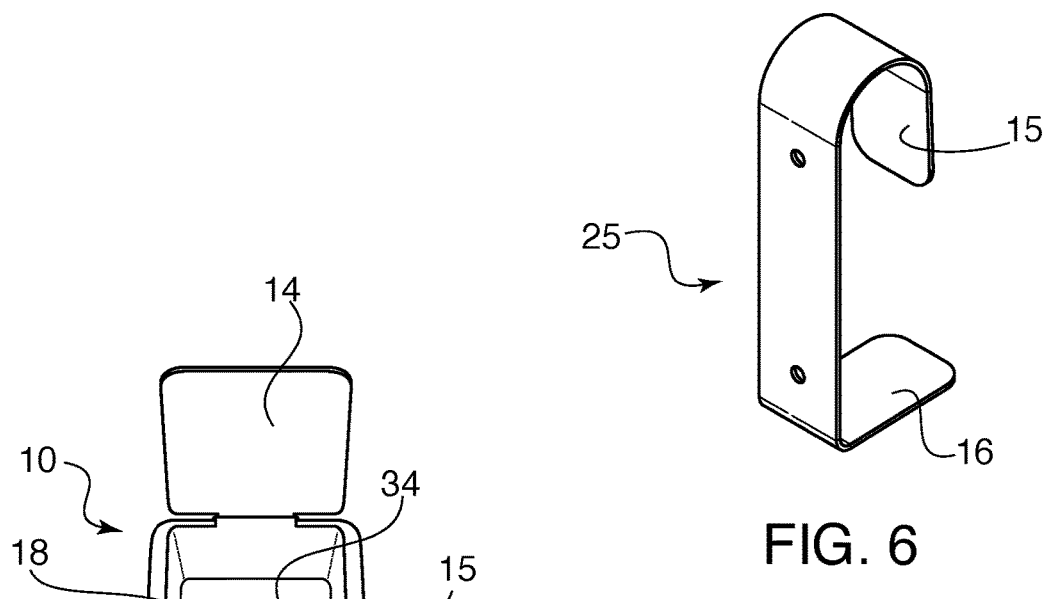
FIG. 6 shows the hook and foot plate for attachment to the container.

As shown in FIG. 6, hook 15 and foot plate 16 can be formed of a single unit 25, which can be attached to housing 12 via any suitable method, such as by screws. Alternatively, hook 15 and foot plate 16 can be separate pieces or can be integrally molded with the housing.

Figure 7:
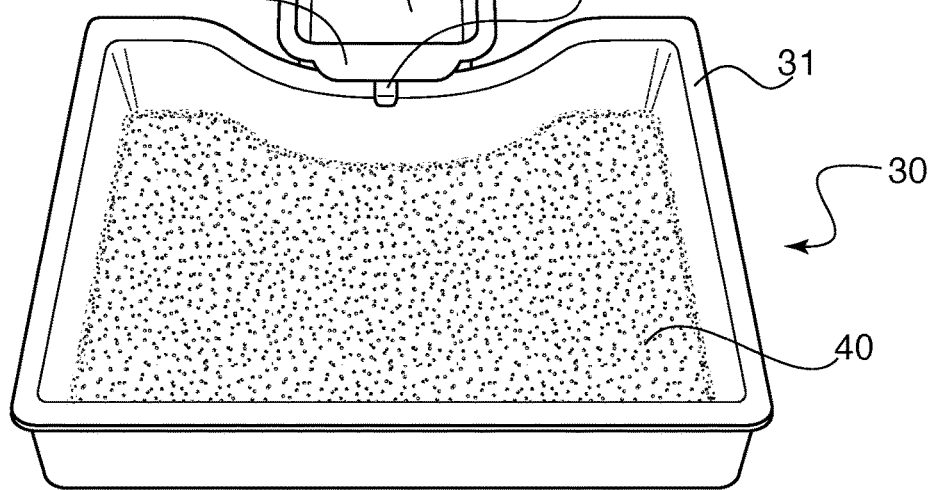
FIG. 7 shows a top view of the container connected to a litter box.
Figure 8:
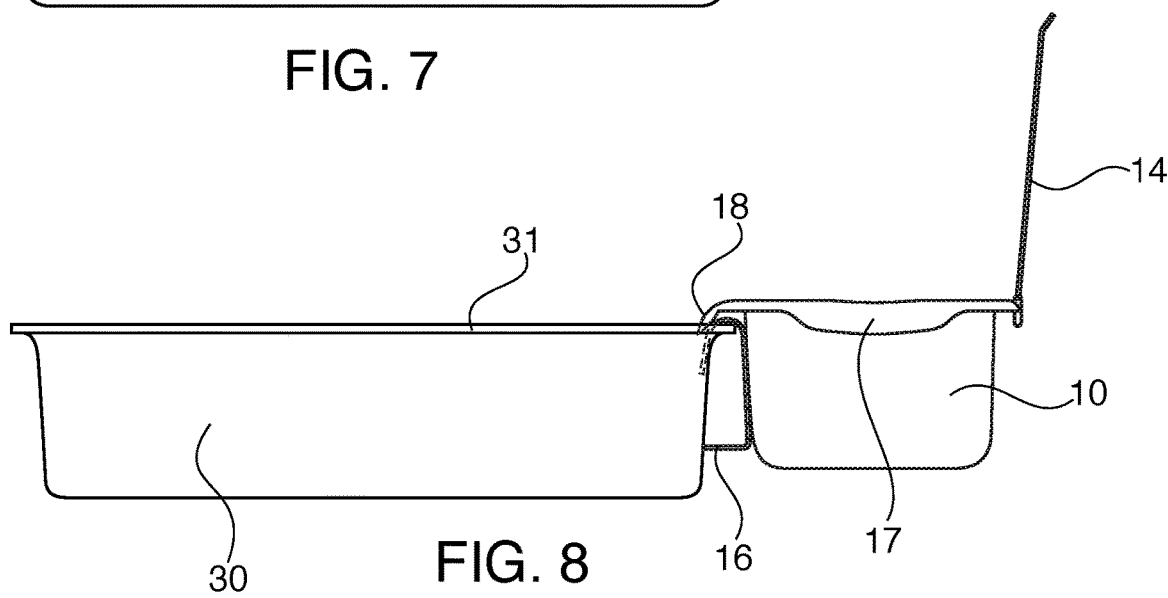
FIG. 8 shows a side view of the container connected to the litter box.

FIGS. 7 and 8 show the waste container 10 connected to a litter box 30. Litter box 30 has a top edge 31 into which hook 15 is arranged. As shown in FIG. 8, foot plate 16 braces container 10 in an upright position against litter box 30. Covering surface 18 extends over the top edge 31 of litter box 30, so that litter 40 from litter box 30 can be scooped from litter box 30, transported across sweeping surface 18 and into cavity 34 of container 10, for storage until disposal, with no risk of spilling the litter outside of the litter box 30 or container 10. A bag can be placed inside container 10 to make disposal of the used litter simpler.

The present invention provides a simple and convenient way to removed used litter from a litter box, while minimizing dust and odor. The container can be transported easily between several litter boxes, as well as waste disposal sites. The container itself can be easily cleaned and is simple and inexpensive to produce.

Accordingly, while only a few embodiments of the present invention have been shown and described, it is obvious that many changes and modifications may be made thereunto without departing from the spirit and scope of the invention.

What is claimed is:

1. A waste container for attachment to a litter box, comprising:
    a housing having a bottom surface and side walls, creating an interior cavity therein;
    a lip surrounding a top edge of the side walls, the lip extending outward from the sidewalls and away from the cavity;
    a hook connected to one of the sidewalls, said hook being configured for attachment to a top edge of the litter box;
    a foot plate extending outward from said one sidewall beneath the hook; and
    a lid configured to cover the cavity,
    wherein when said waste container is connected to the litter box having a sloped side wall, the foot plate supports the waste container in a position where the side walls of the waste container remain vertical, and
    wherein the lip forms a covering surface on the side wall having the hook, such that when the hook is connected to a top rim of the litter box, the covering surface extends over the top rim of the litter box and into the litter box.

2. The waste container according to claim 1, wherein the lip forms carrying handles on two opposite side walls of the housing.

3. The waste container according to claim 1, wherein the hook and foot plate are formed as one piece and are attached to the housing.

4. The waste container according to claim 1, wherein an underside of the lid has a flange extending around a periphery inset from an edge of the lid, said flange abutting the side walls and extending into the cavity when said lid is in a closed position.

5. The waste container according to claim 1 in combination with a litter box, wherein the litter box has a top edge and a side wall, wherein the hook rests on the top edge of the litter box and the foot plate rests on the side wall to keep the waste container in an upright position.

6. A waste container for attachment to a litter box, comprising:
    a housing having a bottom surface and side walls, creating an interior cavity therein;
    a lip surrounding a top edge of the side walls, the lip extending outward from the sidewalls and away from the cavity;
    a hook connected to one of the sidewalls, said hook being configured for attachment to a top edge of the litter box;
    a foot plate extending outward from said one sidewall beneath the hook; and
    a lid configured to cover the cavity,
    wherein when said waste container is connected to the litter box having a sloped side wall, the foot plate supports the waste container in a position where the side walls of the waste container remain vertical
    wherein in a closed position, the lid is flush with or recessed below a height of the lip, and in an open position, the lid is fixed in a vertical position on the housing, and
    wherein one edge of the lid has an attachment projection extending outward therefrom, and wherein a receptacle is provided on the lip of the housing, the receptacle having a recess corresponding to a shape of the projection, such that placing the projection in the recess fixes the lid in the vertical position.

7. The waste container according to claim 6, wherein the projection has at least one locking lug that is snapped into the recess to connect the lid to the housing.

8. The waste container according to claim 6, wherein the lid has a tab on an edge opposite the projection, the tab extending upward from the lid to facilitate lifting the lid off of the housing.

9. A method for cleaning a litter box, the litter box having a side wall and a top edge, the method comprising the following steps:
  attaching a waste container to the litter box, the waste container comprising:
  a housing having a bottom surface and four side walls, creating an interior cavity therein;
  a lip surrounding a top edge of the four side walls, the lip extending outward from the sidewalls and away from the cavity;
  a hook connected to one of the sidewalls, said hook being resting on a top edge of the litter box; wherein the lip forms a covering surface on the side wall having the hook, such that when the hook is connected to a top rim of the litter box, the covering surface extends over the top rim of the litter box and into the litter box,
  a foot plate extending outward from said one sidewall beneath the hook to support the waste container in an upright position against the litter box; and
  a lid configured to cover the cavity;
  lifting the lid to expose the cavity;
  scooping used litter into the waste container by transporting the used litter from the litter box over the covering surface formed by the lip of the housing; and
  closing the lid.

* * * * *